US008740142B2

(12) United States Patent
McGeer et al.

(10) Patent No.: US 8,740,142 B2
(45) Date of Patent: *Jun. 3, 2014

(54) METHOD AND APPARATUS FOR AUTOMATED LAUNCH, RETRIEVAL, AND SERVICING OF A HOVERING AIRCRAFT

(71) Applicant: Aerovel Corporation, White Salmon, WA (US)

(72) Inventors: Brian T. McGeer, Underwood, WA (US); Andreas H. von Flotow, Hood River, OR (US)

(73) Assignee: Aerovel Corporation, White Salmon, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,295

(22) Filed: May 23, 2013

(65) Prior Publication Data
US 2014/0091177 A1    Apr. 3, 2014

Related U.S. Application Data

(63) Continuation of application No. 13/743,069, filed on Jan. 16, 2013, which is a continuation of application No. 12/702,935, filed on Feb. 9, 2010, now Pat. No. 8,453,966.

(60) Provisional application No. 61/152,076, filed on Feb. 12, 2009.

(51) Int. Cl.
*B64F 1/02* (2006.01)

(52) U.S. Cl.
USPC ............... 244/110 F; 244/63; 244/110 C

(58) Field of Classification Search
USPC .......... 244/110 F, 110 C, 63, 1 R, 116, 110 E
See application file for complete search history.

(56) References Cited

U.S. PATENT DOCUMENTS

| 968,339 A | 8/1910 | Geraldson |
| 1,144,505 A | 6/1915 | Steffan |

(Continued)

FOREIGN PATENT DOCUMENTS

| CA | 781808 | 4/1968 |
| CA | 839101 | 4/1970 |
| EP | 0 472 613 | 4/1992 |

OTHER PUBLICATIONS

Skyhook (Harrier handling system); Harpoon Head Quarters; available at http://www.harpoondatabases.com/encyclopedia/Entry2979.aspx; printed Jun. 21, 2013 (3 pages).

(Continued)

*Primary Examiner* — Christopher P Ellis
*Assistant Examiner* — Medhat Badawi
(74) *Attorney, Agent, or Firm* — Neal, Gerber & Eisenberg LLP

(57) ABSTRACT

Various embodiments of the present disclosure provide an apparatus configured to automatically retrieve, service, and launch an aircraft. For retrieval, the aircraft drops a weighted cable, and pulls it at low relative speed into a broad aperture of the apparatus. In certain instances, the cable is dragged along guiding surfaces of the apparatus into and through a slot until its free end is captured. The aircraft becomes anchored to the apparatus, and is pulled downward by the cable into a receptacle. Guiding surfaces of the receptacle adjust the position and orientation of a probe on the aircraft, directing the probe to mate with a docking fixture of the apparatus. Once mated, the aircraft is automatically shut down and serviced. When desired, the aircraft is automatically started and tested in preparation for launch, and then released into free flight. A full ground-handling cycle is thus accomplished with a simple, economical apparatus.

20 Claims, 6 Drawing Sheets

(56) References Cited

U.S. PATENT DOCUMENTS

| | | | |
|---|---|---|---|
| 1,383,595 A | | 7/1921 | Black |
| 1,499,472 A | * | 7/1924 | Pratt .................. 244/110 G |
| 1,716,670 A | | 6/1929 | Sperry |
| 1,731,091 A | * | 10/1929 | Belleville .................. 244/110 F |
| 1,748,663 A | | 2/1930 | Tucker |
| 1,836,010 A | | 12/1931 | Andrain |
| 2,435,197 A | | 2/1948 | Brodie |
| 2,448,209 A | | 8/1948 | Boyer et al. |
| 2,488,050 A | | 11/1949 | Brodie |
| 2,552,115 A | * | 5/1951 | Replogle .................. 244/100 R |
| 3,980,259 A | | 9/1976 | Greenhalgh et al. |
| 4,123,020 A | * | 10/1978 | Korsak .................. 244/116 |
| 4,147,317 A | | 4/1979 | Mayhew et al. |
| 4,311,290 A | | 1/1982 | Koper |
| 4,680,962 A | | 7/1987 | Durbin |
| 4,753,400 A | | 6/1988 | Reuter et al. |
| 4,790,497 A | | 12/1988 | Yoffe |
| 4,842,222 A | | 6/1989 | Baird |
| 5,039,034 A | | 8/1991 | Burgess et al. |
| 5,042,750 A | | 8/1991 | Winter |
| 5,054,717 A | | 10/1991 | Taylor |
| 5,092,540 A | * | 3/1992 | Burgess et al. .......... 244/110 F |
| 5,687,930 A | | 11/1997 | Wagner et al. |
| 5,799,900 A | | 9/1998 | McDonnell |
| 6,264,140 B1 | | 7/2001 | McGeer et al. |
| 6,824,102 B2 | * | 11/2004 | Haggard .................. 244/110 F |
| 6,874,729 B1 | | 4/2005 | McDonnell |
| 6,961,018 B2 | | 11/2005 | Heppe et al. |
| 7,066,430 B2 | | 6/2006 | Dennis et al. |
| 7,097,137 B2 | | 8/2006 | McDonnell |
| 7,104,495 B2 | | 9/2006 | McGeer |
| 7,121,507 B2 | | 10/2006 | Dennis et al. |
| 7,140,575 B2 | | 11/2006 | McGeer et al. |
| 7,143,974 B2 | | 12/2006 | Roeseler et al. |
| 7,143,976 B2 | * | 12/2006 | Snediker et al. .......... 244/110 G |
| 7,152,827 B2 | | 12/2006 | McGeer |
| 7,165,745 B2 | | 1/2007 | McGeer et al. |
| 7,175,135 B2 | | 2/2007 | Dennis et al. |
| 7,219,856 B2 | * | 5/2007 | Watts et al. ................. 244/110 F |
| 7,264,204 B1 | * | 9/2007 | Portmann ................. 244/110 C |
| 7,344,108 B2 | * | 3/2008 | Muylaert et al. .............. 244/115 |
| 7,360,741 B2 | | 4/2008 | McGeer et al. |
| 7,410,125 B2 | * | 8/2008 | Steele ................. 244/110 E |
| 7,510,145 B2 | * | 3/2009 | Snediker ................. 244/110 F |
| 7,712,702 B2 | | 5/2010 | McGeer et al. |
| 7,954,758 B2 | * | 6/2011 | McGeer et al. ............. 244/110 F |
| 8,245,968 B2 | * | 8/2012 | McGeer et al. ............. 244/110 C |
| 8,276,844 B2 | | 10/2012 | Kariv |
| 8,348,193 B2 | * | 1/2013 | McGeer et al. ............. 244/110 C |
| 8,453,966 B2 | | 6/2013 | McGeer et al. |
| 8,464,981 B2 | | 6/2013 | Goldie et al. |
| 2002/0100838 A1 | | 8/2002 | McGeer et al. |
| 2003/0222173 A1 | | 12/2003 | McGeer et al. |
| 2004/0256519 A1 | | 12/2004 | Ellis et al. |
| 2005/0133665 A1 | | 6/2005 | Dennis et al. |
| 2005/0151014 A1 | | 7/2005 | McGeer |
| 2005/0178894 A1 | | 8/2005 | McGeer et al. |
| 2005/0178895 A1 | | 8/2005 | McGeer et al. |
| 2005/0189450 A1 | | 9/2005 | Roeseler et al. |
| 2005/0230536 A1 | | 10/2005 | Dennis et al. |
| 2006/0065780 A1 | * | 3/2006 | Rednikov .................. 244/115 |
| 2006/0102783 A1 | | 5/2006 | Dennis et al. |
| 2006/0175463 A1 | * | 8/2006 | McGeer .................. 244/1 R |
| 2006/0175466 A1 | * | 8/2006 | Snediker et al. .......... 244/110 G |
| 2006/0249623 A1 | * | 11/2006 | Steele .................. 244/116 |
| 2007/0051849 A1 | * | 3/2007 | Watts et al. ................. 244/110 F |
| 2007/0075185 A1 | | 4/2007 | McGeer et al. |
| 2007/0158498 A1 | * | 7/2007 | Snediker ................. 244/110 F |
| 2007/0252034 A1 | | 11/2007 | McGeer et al. |
| 2008/0156932 A1 | * | 7/2008 | McGeer et al. ............. 244/110 C |
| 2008/0203220 A1 | | 8/2008 | Hanzlick et al. |
| 2009/0224097 A1 | * | 9/2009 | Kariv .................. 244/63 |
| 2011/0024559 A1 | | 2/2011 | McGeer et al. |
| 2011/0133024 A1 | * | 6/2011 | McGeer et al. .................. 244/63 |
| 2011/0233329 A1 | * | 9/2011 | McGeer et al. ............. 244/110 F |
| 2012/0187243 A1 | | 7/2012 | Goldie et al. |
| 2012/0273612 A1 | * | 11/2012 | McGeer et al. ............. 244/110 F |
| 2013/0161447 A1 | * | 6/2013 | McGeer et al. ............. 244/110 F |

OTHER PUBLICATIONS

A miniature powerplant for very small, very long range autonomous aircraft, S.P. Hendrickson and. T. McGeer, Final Report under U.S. DoE contract No. DE-FG03-96ER82187, Sep. 29, 1999 (25 pages).
Aerosonde hazard estimation, T. McGeer, 1994 (7 pages).
Aerosonde Pacific reconnaissance: ready when you are!, T. McGeer, Pacific Northwest Weather Workshop, Mar. 2005 (15 pages).
An Airspeed Vector Sensor for V/STOL Aircraft, E. Durbin and T. McGeer, Journal of Aircraft, vol. 19, No. 6, Jun. 1982 (7 pages).
Automated Launch, Recovery, and Refueling for Small Unmanned Aerial Vehicles, K. Mullens, et al., 2004 (11 pages).
Autonomous Aerosondes for Economical Atmospheric Soundings Anywhere on the Globe, G.J. Holland, T. McGeer and H.H. Youngren, Bulletin of the American Meteorological Society, vol. 73, No. 12, Dec. 1992 (12 pages).
European Search Report for European Patent Application No. 10250229.1, dated Jan. 21, 2013 (5 pages).
Examiner's First Report for Australian Patent Appiication No. 2007347147, dated Oct. 26, 2011 (2 pages).
Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).
International Search Report (PCT/US2007/076276), dated Sep. 22, 2008 (7 pages).
Laima: The First Atlantic Crossing by Unmanned Aircraft, T. McGeer, Feb. 25, 1999 (25 pages).
Quantitative Risk Management as a Regulatory Approach to Civil UAVs, T. McGeer, L. Newcombe, and J. Vagners, International: Workshop on UAV Certification, Jun. 4, 1999 (11 pages).
Regulatory Issues Involving Long-Range Weather Observation by Aerosonde Autonomous Aircraft, T. McGeer, Oct. 9, 1998 (8 pages).
Safety, Economy, Reliability and Regulatory Policy for Unmanned Aircraft, T. McGeer, Mar. 2007 (9 pages).
The Beantrap—A Canadian Invention, Crowsnest Magazine, vol. 17, Nos. 3 and 4 [online], Mar.-Apr. 1965, [retrieved on Sep. 14, 2007]. Retrieved from the Internet at <URL: http://www.readyayeready.comftimelinef1960s/beartrapfindex.htm> (4 pages).
Wide-Scale Use of Long-Range Miniature Aerosondes Over the World's Oceans, T. McGeer and J. Vagners, 1999 (25 pages).
Written Opinion (PCT/US2007/076276), dated Mar. 5, 2009 (6 pages).

\* cited by examiner

METHOD AND APPARATUS FOR AUTOMATED LAUNCH, RETRIEVAL, AND SERVICING OF A HOVERING AIRCRAFT

PRIORITY CLAIM

This application is a continuation of, and claims priority to and the benefit of, U.S. patent application Ser. No. 13/743,069, filed on Jan. 16, 2013, which is a continuation of, and claims priority to and the benefit of, U.S. patent application Ser. No. 12/702,935, filed on Feb. 9, 2010, which claims priority to and the benefit of U.S. Provisional Patent Application No. 61/152,076, filed on Feb. 12, 2009, now expired, the entire contents of each of which are incorporated herein by reference.

CROSS REFERENCE TO RELATED APPLICATIONS

The present application relates to the following commonly-owned co-pending patent applications: U.S. patent application Ser. No. 13/717,147, filed on Dec. 17, 2012; U.S. patent application Ser. No. 13/037,436, filed on Mar. 1, 2011; U.S. patent application Ser. No. 13/527,177, filed on Jun. 19, 2012; U.S. patent application Ser. No. 12/702,935, filed on Feb. 9, 2010; U.S. patent application Ser. No. 13/743,069, filed on Jan. 16, 2013; and U.S. patent application Ser. No. 13/899,172, filed on May 21, 2013.

BACKGROUND

1. Field of Invention

The present invention addresses launch, retrieval, and servicing of a hovering aircraft, especially in turbulent winds or onto an irregularly-moving surface, such as the deck of a ship in a rough sea. Various embodiments of the present invention are especially suited to unmanned aircraft of small size. These embodiments allow for a fully automated operations cycle, whereby the aircraft can be repeatedly launched, retrieved, serviced, and re-launched, without manual intervention at any point, and while requiring only modest accuracy in piloting.

2. Description of Problem

Hovering aircraft, be they helicopters, thrust-vectoring jets, "tail-sitters", or other types, usually land by gently descending in free thrust-borne flight onto a landing surface, coming to rest on an undercarriage of wheels, skids, or legs. This elementary technique can be problematic in certain situations, such as when targeting a small, windswept landing pad on a ship moving in a rough sea. Decades ago, the Beartrap or RAST system was developed to permit retrieval with acceptable safety in such conditions. Retrieval with this system involves securing a line between a helicopter and landing deck, and then winching the helicopter down onto a trolley. The helicopter is fastened to the trolley. After retrieval, the trolley is used to move the helicopter along the deck. The system is effective and widely used, but requires an expensive and substantial plant in the landing area, as well as manual operations coordinated between helicopter and shipboard crew. Furthermore, the helicopter must carry a complete undercarriage in addition to the necessary Beartrap components.

Desirable improvements relative to the Beartrap system include (a) simplification of the apparatus, and (b) automated rather than manual operation. Ideally not only would retrieval but also subsequent refueling and launch would be automated. This would be particularly desirable for an unmanned aircraft, whose operations cycle could then be made fully autonomous. Some experimental work toward this objective has been done for a hovering aircraft, as described in the publication by Mullens et al. titled, "Automated Launch, Recovery, and Refueling for Small Unmanned Aerial Vehicles" (2004); however, success has been limited even with light wind and a stationary base. The present invention by contrast provides for fully automated operation in calm or rough conditions, using apparatus which is simple, portable, and suitable for a small vessel or similarly confined base.

SUMMARY

In one embodiment of the method of the present invention, an aircraft would proceed automatically from free thrust-borne flight to retrieval to launch through the following sequence of actions:

(a) while approaching a base at low relative speed, the aircraft drops a weighted cable;

(b) the aircraft then flies over a retrieval apparatus, which brings the cable into an aperture of cable guides, which in one embodiment forms the shape of a V in the horizontal or substantially horizontal plane;

(c) further translation pulls the cable into and through a slot at the terminus of the cable guides, which captures the cable;

(d) the aircraft is then anchored;

(e) if the cable is not captured, the aircraft can climb away and return for another approach;

(f) the aircraft, recognizing capture of the cable by an increase in tension, winches-in the cable and so draws itself into a docking receptacle, such as, in one embodiment, a funnel-like receptacle at the vertex of the cable guides;

(g) as the aircraft is drawn into the docking receptacle, guiding surfaces align and ultimately mate the aircraft with one or more connectors for docking and servicing;

(h) the cable is released from the retrieval apparatus, and retracted by the aircraft;

(i) the aircraft is shut-down, refueled and otherwise serviced as necessary through one or more suitable connectors;

(j) the aircraft completes launch preparations, and develops sufficient thrust to accelerate away from the retrieval apparatus when released; and (k) the aircraft is released into thrust-borne free flight.

Since loads can be low during retrieval from hover, the apparatus can be light and portable. Furthermore, easy targeting makes the technique well-suited for both manual control and economical automation.

It should be appreciated that the apparatus of various embodiments of the present invention include an aircraft docking assembly attached to an aircraft, a base retrieval apparatus attached to a stationary or movable base, and the combination of these configured so as to accomplish the methods of the present invention.

Additional features and advantages are described herein, and will be apparent from the following Detailed Description and the Figures.

DETAILED DESCRIPTION

Figure 1A:
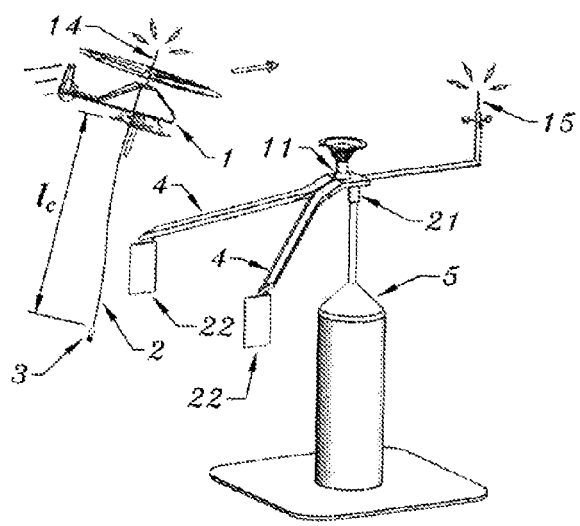
FIGS. 1A, 1B, 1C and 1D are a series of diagrammatic rear-quarter perspective views of an embodiment of the present invention for a helicopter, illustrating an aircraft docking assembly attached to the helicopter, a base retrieval apparatus or servicing station, and the helicopter sequentially entering, capturing, docked in, and launching from the base retrieval apparatus or servicing station.
Figure 1B:
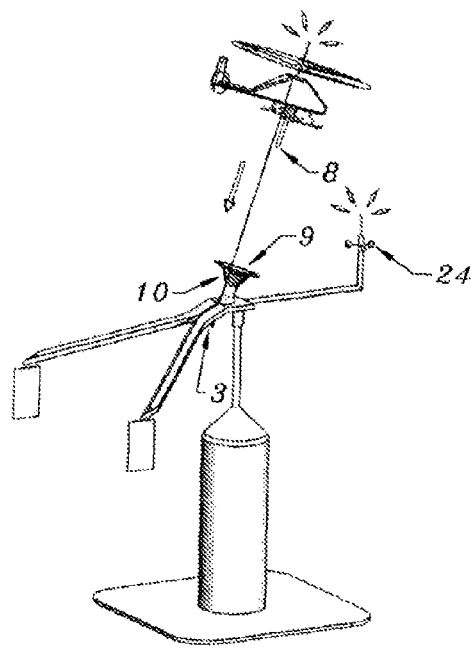
Figure 1C:
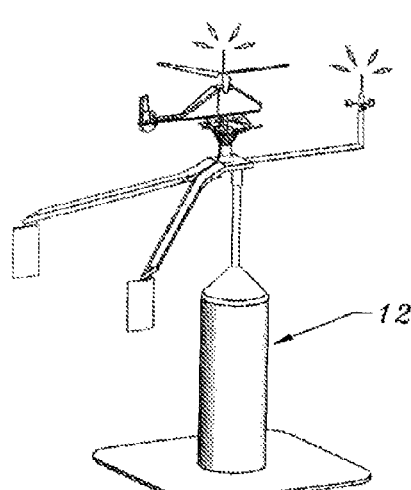
Figure 1D:
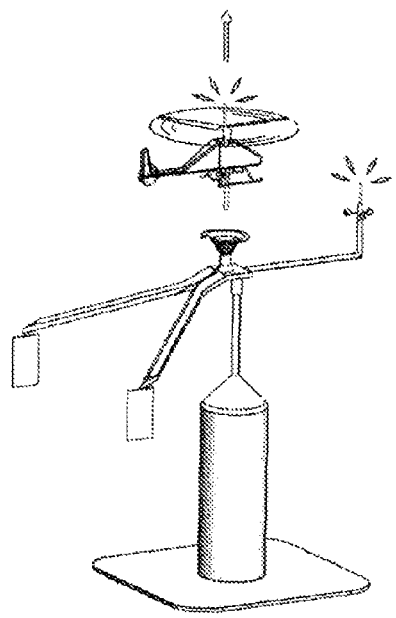

Various embodiments of the present invention are generally directed to apparatus and methods for retrieving a flying object or an aircraft from substantially thrust-borne free flight. In one embodiment, the apparatus includes an aircraft docking assembly for a helicopter and a base retrieval apparatus attachable to a stationary or movable base. In another embodiment, the apparatus includes an aircraft docking assembly for an aircraft configured for efficient wing-borne flight and a base retrieval apparatus attachable to a stationary or movable base. It should be appreciated that the present invention is not limited to the embodiments illustrated in the figures and described below, and that in alternative embodiments, the shape, size, configuration and/or arrangement of one or more of the various components described below may vary. It should also be appreciated that the present invention need not include each and every of the components in the embodiments illustrated in the figures and described below.

Referring now to FIGS. 1A, 1B, 1C, 1D and 2, one embodiment of the aircraft docking assembly and base retrieval apparatus for a helicopter are generally illustrated. The base retrieval apparatus includes a base station 5 having a base fuel tank 12 and a base member 33 extending upwardly from the base fuel tank 12. The base station 5 may include an azimuthal pivot 21, as described below. In the illustrated embodiment, the base station 5 also includes support member 34 connected to the base member 33 for supporting a base docking device, fixture or probe receiver 11. A guide, funnel, or funnel like docking receptacle 9 is attached to, and extends upwardly from, the base docking device, fixture or probe receiver 11. The guide, funnel, or funnel like docking receptacle 9 includes guiding surfaces. The guide, funnel, or funnel like docking receptacle 9 has or defines a slot 10 configured to admit a cable 2, as discussed below. The support member 34 includes outwardly extending arms 4. The arms 4 extend outwardly defining an angle. A slot 6 is defined or placed near the vertex of the arms 4. Aerodynamic surfaces or members 22 may be respectively attached to the arms 4.

In one of the illustrated embodiments, the aircraft docking assembly is attached to the helicopter and includes a cable 2, a cable point or fixture such as a cable end fitting 3, a cable length reducer such as a winch 7, and an aircraft docking device or fixture such as a probe 8. The probe includes guiding surfaces and is substantially cylindrically shaped in one embodiment. The probe 8 is attached to the helicopter and extends beyond the skids 26 of the helicopter. At least a portion of the cable 2 is configured to be wound around a drum of the winch 7. In another embodiment, the winch 7 is attached to the base retrieval apparatus as described below.

Figure 2:
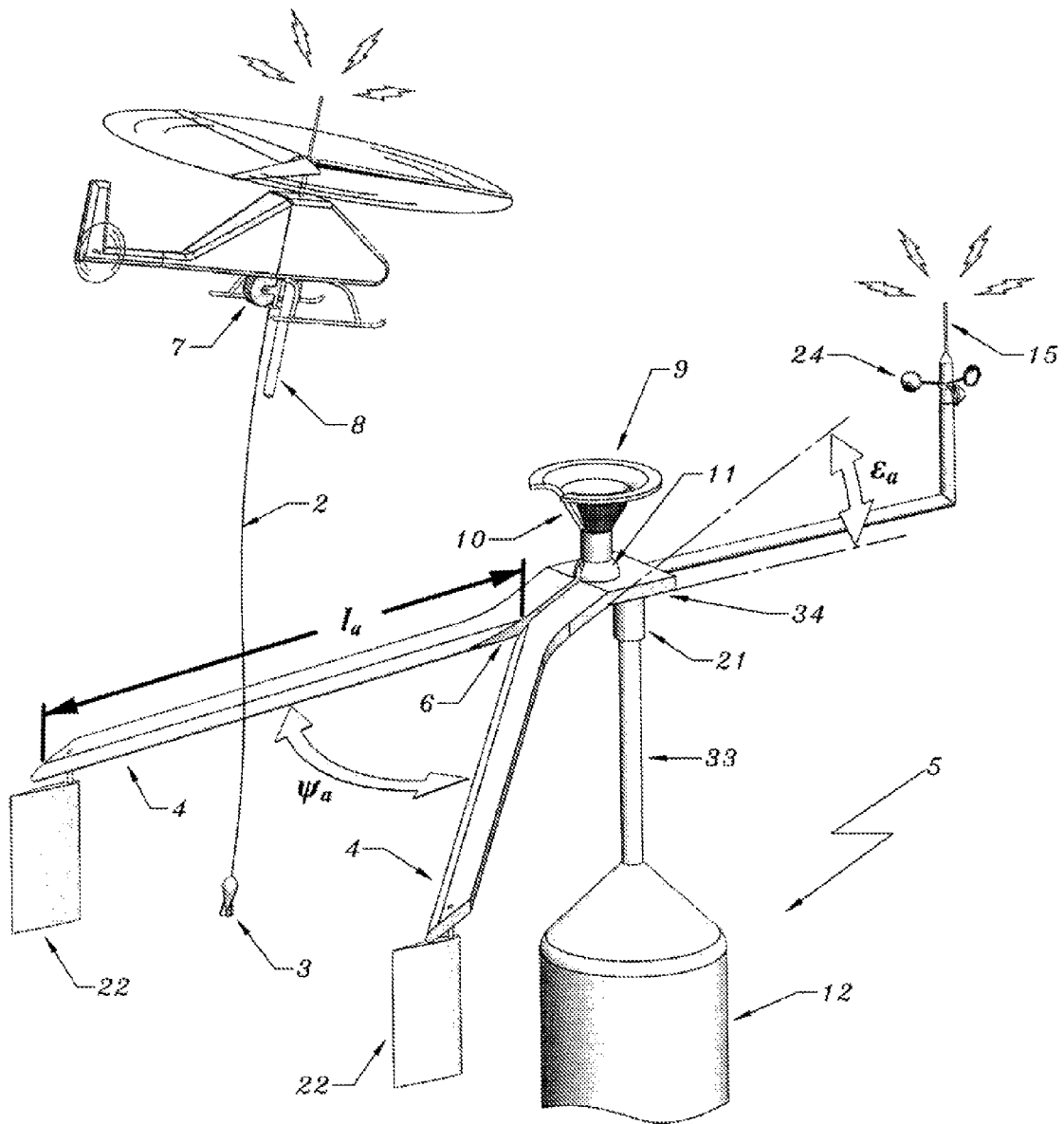
FIG. 2 is an enlarged partially fragmentary perspective view of a the base retrieval apparatus or servicing station for capturing, docking, servicing, and launching a helicopter.
Figure 3A:
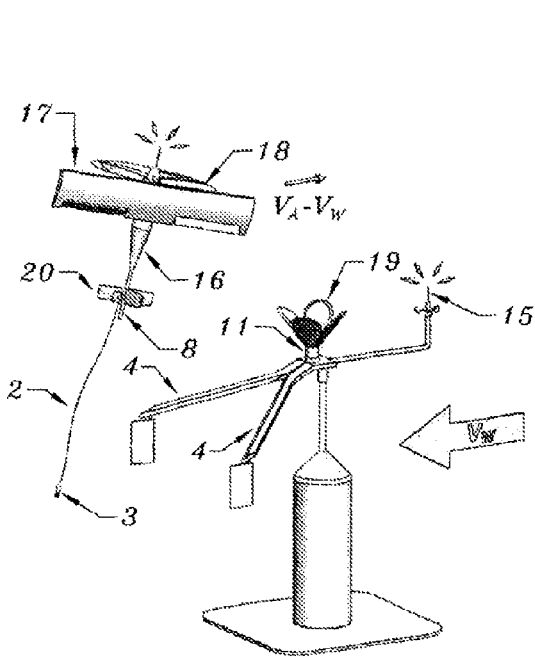
FIGS. 3A, 3B, 3C and 3D are a series of diagrammatic rear-quarter perspective views of an embodiment of the present invention for a hovering "tail-sitter" aircraft, illustrating an aircraft docking assembly attached to the aircraft, a base retrieval apparatus or servicing station, and the aircraft sequentially entering, capturing, docked in, and launching from the base retrieval apparatus or servicing station.
Figure 3B:
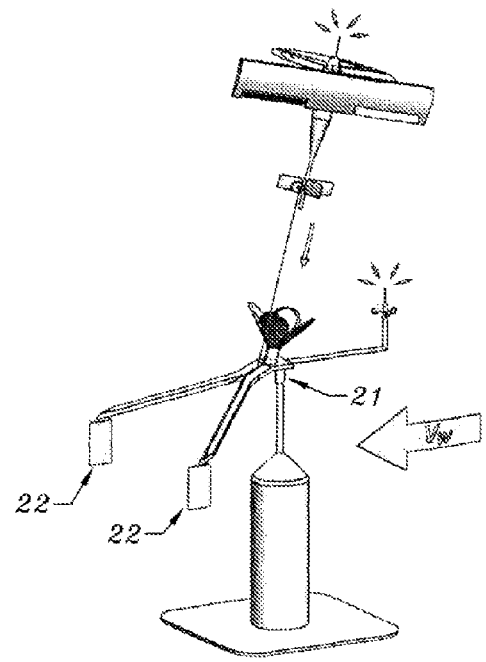
Figure 3C:
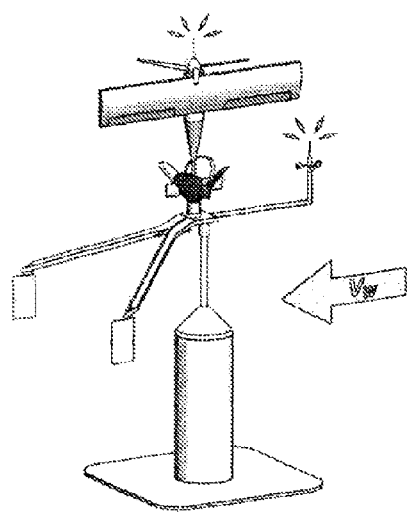
Figure 3D:
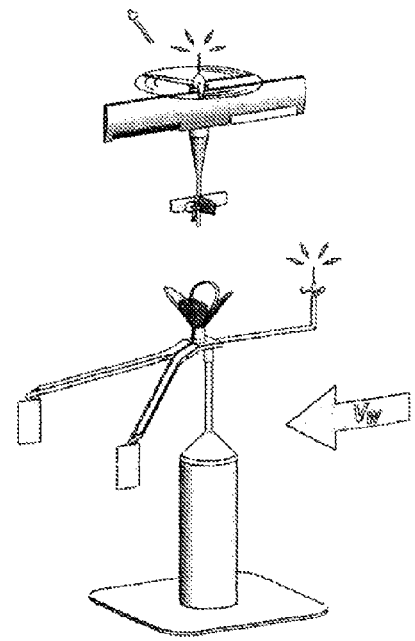
Figure 4:
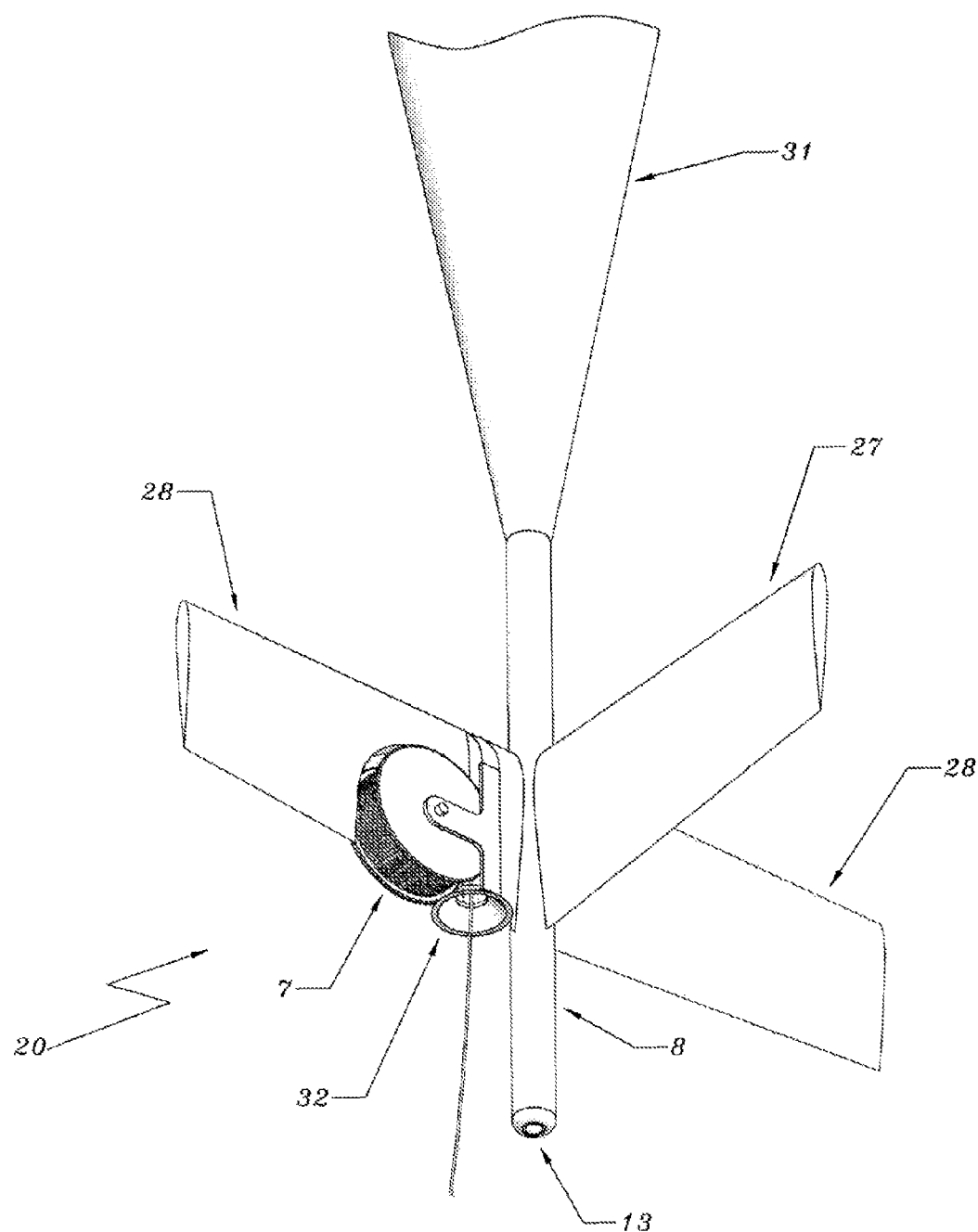
FIG. 4 is an enlarged perspective view of a representative docking probe mounted in the tail of a "tail-sitter" aircraft of one embodiment of the present invention.

More specifically, FIGS. 1A, 1B, 1C and 1D show an illustrative embodiment of the present invention, as used with the helicopter 1 of conventional layout. In preparation for retrieval, the helicopter 1 deploys the lightweight cable 2 weighted by the cable end fitting 3, and drags it between the arms 4 of the base station 5. If the helicopter's path falls within a capture envelope—determined by, primarily, the length Ia, vertex angle ψa, and droop angle ca of the arms, and the length Ic of the cable (and associated height of the servicing apparatus)—then the cable is guided into a cable holder configured to hold the cable 2 (through the slot 6 located at the vertex of the arms 4 as shown in FIG. 2). The helicopter pulls the cable through the slot 6 until further motion is restrained by the cable end fitting 3. The cable end fitting thus anchors the helicopter. In various embodiments, the cable end fitting, cable, or slot may be made compliant to limit shock loading. If the helicopters path is such that the cable misses the arms entirely, or is pulled over an arm before reaching the slot 6, then the helicopter simply continues in free flight, and can return for another approach.

Once the helicopter is anchored it can increase thrust, and the cable will tend to stay nearly vertical despite disturbances. The helicopter's position can also be regulated by appropriate control, for example of rotor thrust and in-plane moments.

The constraint imposed by the anchored cable can be recognized by the helicopter, and used to trigger the next retrieval step. This involves pulling the helicopter downward toward the base docking device, fixture or probe receiver 11, for example by activating a winch 7 on the helicopter or on the base station. In one embodiment, this causes the probe 8 on the helicopter to enter, and to be guided to the base of, the guide, funnel, or funnel like docking receptacle 9 on the base station. In one embodiment, the funnel incorporates a cable aperture such as a slot 10 to admit the cable, and thus allow for close placement of the cable and probe on the helicopter. The guide, funnel, or funnel like docking receptacle 9 guides the probe 8 to mate or match firmly with the base docking device, fixture or probe receiver 11, thus completing the retrieval. Mating or matching can be detected by a suitable sensor in the probe or in the base docking device, fixture or probe receiver 11.

Once retrieval is complete, the cable can be released from the capture slot, and optionally retracted into the helicopter. The helicopter's engine can be stopped. Servicing, such as provision of electrical power, refueling from a base supply, and weighing of the aircraft, can be effected through one or more suitable connectors and sensors in the probe 8 and base docking device, fixture or probe receiver 11. The helicopter can remain docked until such time as launch is desired. These connectors can be configured to automatically transfer fluids and/or electricity to the aircraft.

For launch, appropriate self-testing can be completed, and the helicopter then run-up. Release into free flight should be permitted only when thrust is sufficient for positive separation. This condition can be enforced by various ways, such as an appropriately large break-out force in the docking fixture, or a suitable combination of thrust measurement and active triggering of an unlocking device (not shown). The aircraft would extract the cable from the docking fixture through the slot 10 and could then winch it onboard.

Referring now to FIGS. 3A, 3B, 3C, 3D, 4, 5, 6A, 6B, 6C and 6D, one embodiment of an docking assembly and base retrieval apparatus for an aircraft configured for efficient wing-borne flight is generally illustrated. The aircraft includes a fixed wing 17, a propeller 18, a fuselage 31, and an empennage 20. The empennage 20 includes vertical stabilizer 27 and horizontal stabilizers 28. The aircraft docking assembly includes cable 2, cable end fitting 3, aircraft docking device or fixture such as a probe 8, and winch 7. In another embodiment, the winch 7 is attached to the base retrieval apparatus as described below. The probe 8 may include fuel and electrical connectors 13 located at an end portion of the probe 8. A cable guide 32 may be included to guide the cable as it is wound from the drum of the winch 7. In the illustrated embodiment, such a cable guide 32 is formed in the shape of a funnel.

The illustrated base retrieval apparatus for an aircraft configured for efficient wing-borne flight includes base station 5 having a base fuel tank 12 and a base member 33 extending upwardly from the base fuel tank 12. The base station 5 also includes support member 34 connected to the base member 33 for supporting a base docking device, fixture or probe receiver 11. The guide, funnel, or funnel like docking receptacle 9 is replaced by guide or docking receptacle 19, having edges 35 that serve to admit and orient the empennage surfaces 27 and 28 of the aircraft as it is pulled into base docking device, fixture or probe receiver 11, as discussed below. The support member 34 includes arms 4. The arms 4 extend outwardly defining an angle. A slot 6 is defined or placed near the vertex of the arms 4. Aerodynamic surfaces or members 22 may be respectively attached to a portion of the arms 4. In one embodiment, the base station 5 may include an azimuthal pivot 21, as described below.

Figure 5:
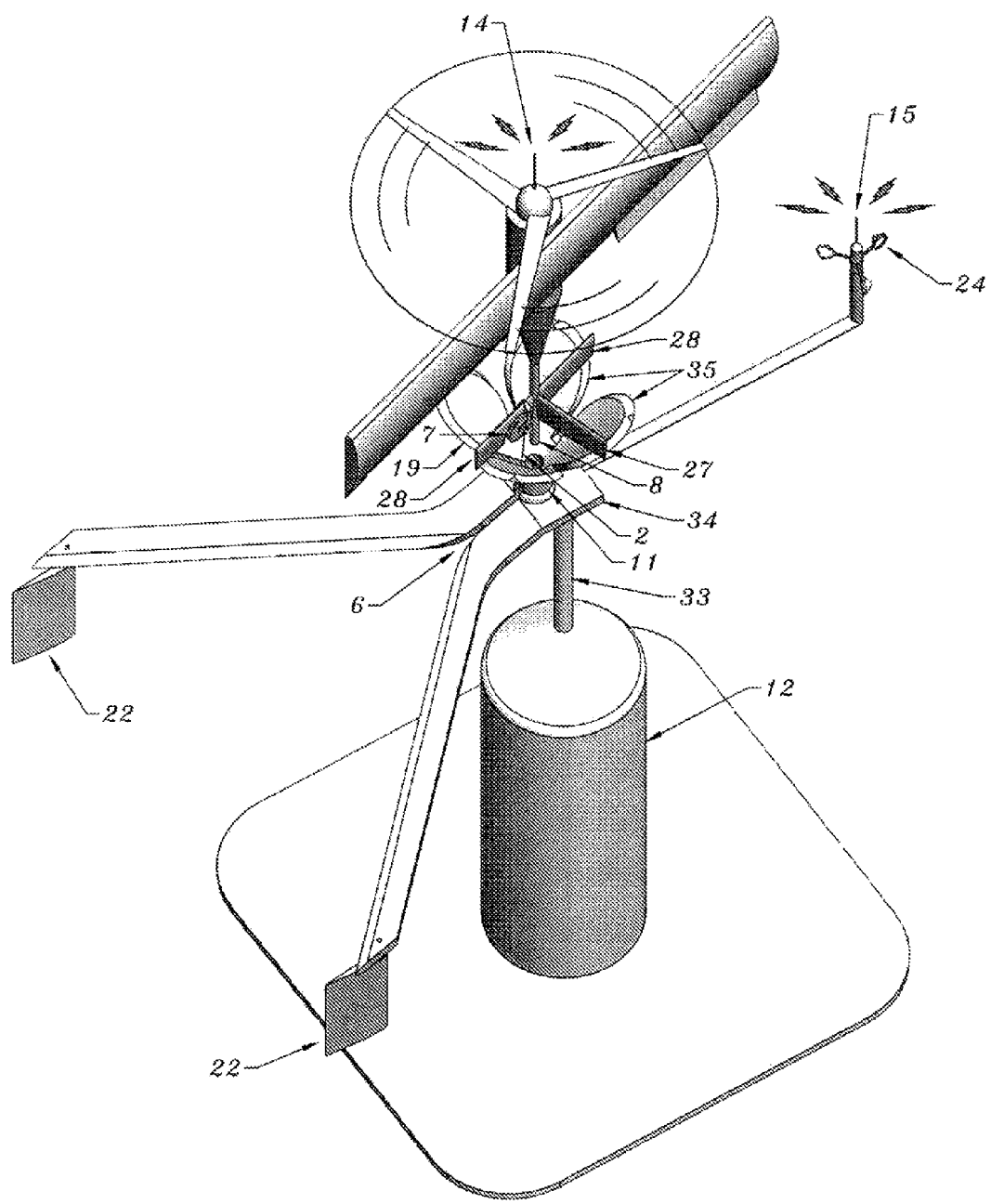
FIG. 5 is a perspective view of a representative aircraft as in FIG. 4 being pulled into a docking receptacle of the base retrieval apparatus of one embodiment of the present invention.

FIG. 3 shows the aircraft 16 having a configuration suited to efficient wing-borne flight. A propeller 18 is installed at its nose, with the propeller's spin axis aligned with the fuselage 31. The winch 7 and probe 8, which are comparable to those in FIGS. 1A, 1B, 1C and 1D and FIG. 2, are mounted at the rear of the fuselage 31, as shown in more detail by FIG. 4 and described above. To prepare for retrieval, the aircraft pitches up from wing-borne flight, with its thrust line near horizontal, into thrust-borne flight, with its thrust line near vertical. Rotor thrust is adjusted to balance aircraft weight. The cable 2 is then deployed, and retrieval proceeds much as was described for the helicopter of FIGS. 1A, 1B, 1C and 1D and FIG. 2. In this case, however, the guide or docking receptacle 9 of FIGS. 1A, 1B, 1C and 1D and FIG. 2 is replaced by a guide or docking receptacle 19 in the form of a set of petals whose edges 35 serve to admit and orient the empennage surfaces 27 and 28 of the aircraft as its probe 8 is pulled into the base docking device, fixture or probe receiver 11, as illustrated by FIG. 5. Thus, the combination of an appropriately long cable 2, appropriately open arms 4, and appropriately shaped petals, permits successful retrieval across a wide range of aircraft approach paths and orientations. After retrieval, the aircraft can be serviced and re-launched much as was described for the helicopter of FIGS. 1A, 1B, 1C and 1D and FIG. 2.

For automated retrieval, the aircraft and base retrieval apparatus each can be equipped with a suitable device for measuring relative position and velocity in three dimensions, such as satellite-navigation equipment having antennas on the aircraft 14 and on a reference point such as point 15 near the base docking device, fixture or probe receiver 11. In an embodiment, each of the aircraft and base retrieval apparatus can also have equipment for measurement of orientation, such as magnetic or inertial sensors, as well as appropriate mechanisms for computation, power supply, and communication.

Communication between the aircraft and base retrieval apparatus can also be used, for example, to trigger the base retrieval apparatus to release the cable in the event of an anomaly, such as an excessive mismatch in position or orientation as the aircraft is pulled toward the base docking device, fixture or probe receiver 11. In that case, the aircraft would fly clear of the base station and could return for another approach.

In many cases, the preferred approach direction will vary with wind velocity. This can be accommodated by providing a base retrieval apparatus including a base station mounted on the azimuthal pivot 21 (as shown in FIG. 2). The base support member 34 could then be oriented or rotated by a suitable actuator on the pivot, or by the weathervane action of the suitably placed aerodynamic surfaces or members 22.

In light to moderate wind, the preferred approach direction would typically be upwind. However, if the wind speed $V_W$ were to exceed the maximum airspeed $V_{A,max}$ at which an aircraft such as that shown in FIGS. 3A, 3B, 3C and 3D could sustain level thrust-borne flight, then an upwind approach would be possible only while descending. For an approach in level flight, the procedure illustrated in FIGS. 6A, 6B, 6C and 6D would be used instead. In this case, the aircraft would fly into the wind at a designated airspeed $V_A$, while drifting downwind toward the base station at speed ($V_W$-$V_A$). Capture of the cable would proceed as described for FIGS. 1A, 1B, 1C and 1D and FIGS. 3A, 3B, 3C and 3D; however, once anchored, the aircraft would not be able to hover vertically above the base docking receptacle. Instead, the aircraft could hover, and so maintain line tension, only in a downwind kite-like position as shown in FIG. 6B.

Figure 6A:
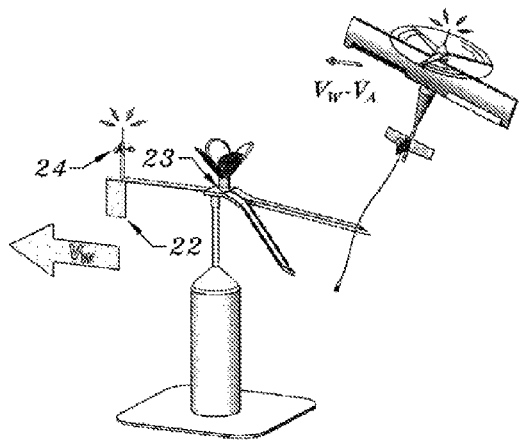
FIGS. 6A, 6B, 6C and 6D are a series of diagrammatic rear-quarter perspective views of an embodiment of the present invention for a hovering aircraft, illustrating a possible downwind retrieval and launch sequence.
Figure 6B:
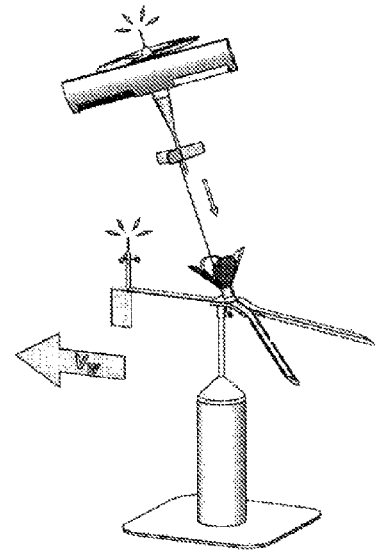

To accommodate this situation, the base docking device, fixture or probe receiver and the guide or docking receptacle may be mounted on a gimbal 23 so that the axis of the funnel can align with the cable, as shown in FIG. 6B. The gimbal could be set as desired after the aircraft mated to the base docking device, fixture or probe receiver, typically to thrust-vertical orientation. The torque necessary thus to orient the gimbal can be provided by the aircraft itself, or by an actuator on the base station. Once set at the desired orientation, the gimbal can be locked in place by an appropriate mechanism.

Figure 6C:
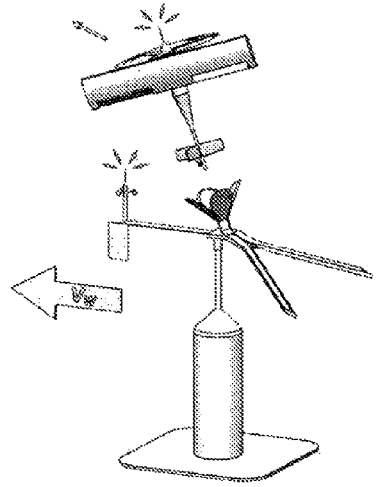
Figure 6D:
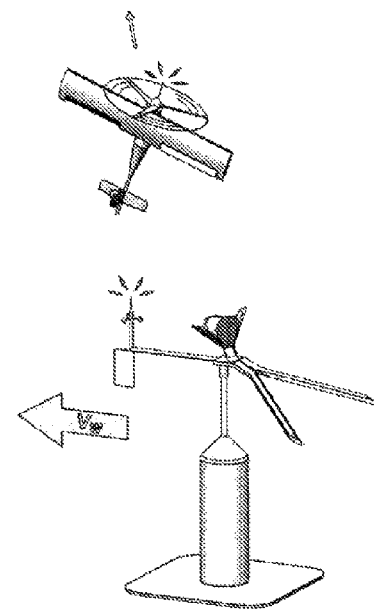

For launch in a strong wind, a downwind gimbal tilt may likewise be necessary for the aircraft to accelerate out of the base docking device, fixture or probe receiver upon release. In preparation for such a downwind launch, the gimbal can be unlocked and tilted as appropriate. The aircraft can then pull itself out of the base docking device, fixture or probe receiver as shown in FIG. 6C. Once clear, the aircraft could reorient if desired to reduce the downwind drift rate, as shown in FIG. 6D. An anemometer 24 on the base station can be used to select the appropriate orientation for launch.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for retrieving a flying object from free flight, said method comprising:
   (a) causing a member connected to a body of the flying object to be received by a member holder of a docking station, the docking station supported by a base and configured to receive a portion of the flying object;

(b) thereafter, causing the member holder to hold the member; and (c) causing a member mover of the docking station to move the member relative to the docking station to cause the flying object to move toward the docking station.

2. The method of claim 1, which includes causing the member mover to move the member relative to the docking station until the docking station receives the portion of the flying object.

3. The method of claim 2, which includes detecting when the docking station receives the portion of the flying object using a sensor and stopping the movement of the member relative to the docking station when the sensor detects that the docking station receives the portion of the flying object.

4. The method of claim 1, which includes securing the flying object using a locking device after the docking station receives the portion of the flying object.

5. The method of claim 1, which includes servicing the flying object using at least one connector after the docking station receives the portion of the flying object.

6. The method of claim 5, wherein said servicing is performed automatically.

7. The method of claim 1, which includes facilitating launch of the flying object using at least one launch orienting device.

8. The method of claim 7, wherein facilitating launch of the flying object includes tilting the docking station using the at least one launch orienting device.

9. The method of claim 1, which includes measuring a three-dimensional position of the flying object relative to the apparatus.

10. The method of claim 1, which includes measuring an orientation of the flying object relative to the apparatus.

11. The method of claim 1, which includes causing the member holder to release the member to facilitate launch of the flying object.

12. A method for retrieving a flying object from free flight, said method comprising:

(a) causing a flexible member connected to a body of the flying object to be received by a member holder of a docking station, the docking station supported by a base and configured to receive a portion of the flying object;

(b) thereafter, causing the member holder to hold the member; and (c) causing a member mover of the docking station to move the member relative to the docking station until the docking station receives the portion of the flying object.

13. The method of claim 12, which includes detecting when the docking station receives the portion of the flying object using a sensor and stopping the movement of the member relative to the docking station when the sensor detects that the docking station receives the portion of the flying object.

14. The method of claim 12, which includes securing the flying object using a locking device after the docking station receives the portion of the flying object.

15. The method of claim 12, which includes servicing the flying object using at least one connector after the docking station receives the portion of the flying object.

16. The method of claim 15, wherein said servicing is performed automatically.

17. The method of claim 15, which includes facilitating launch of the flying object using at least one launch orienting device.

18. The method of claim 15, which includes measuring a three-dimensional position of the flying object relative to the apparatus.

19. The method of claim 15, which includes measuring an orientation of the flying object relative to the apparatus.

20. The method of claim 15, which includes causing the member holder to release the member to facilitate launch of the flying object.

* * * * *